UNITED STATES PATENT OFFICE 2,438,247

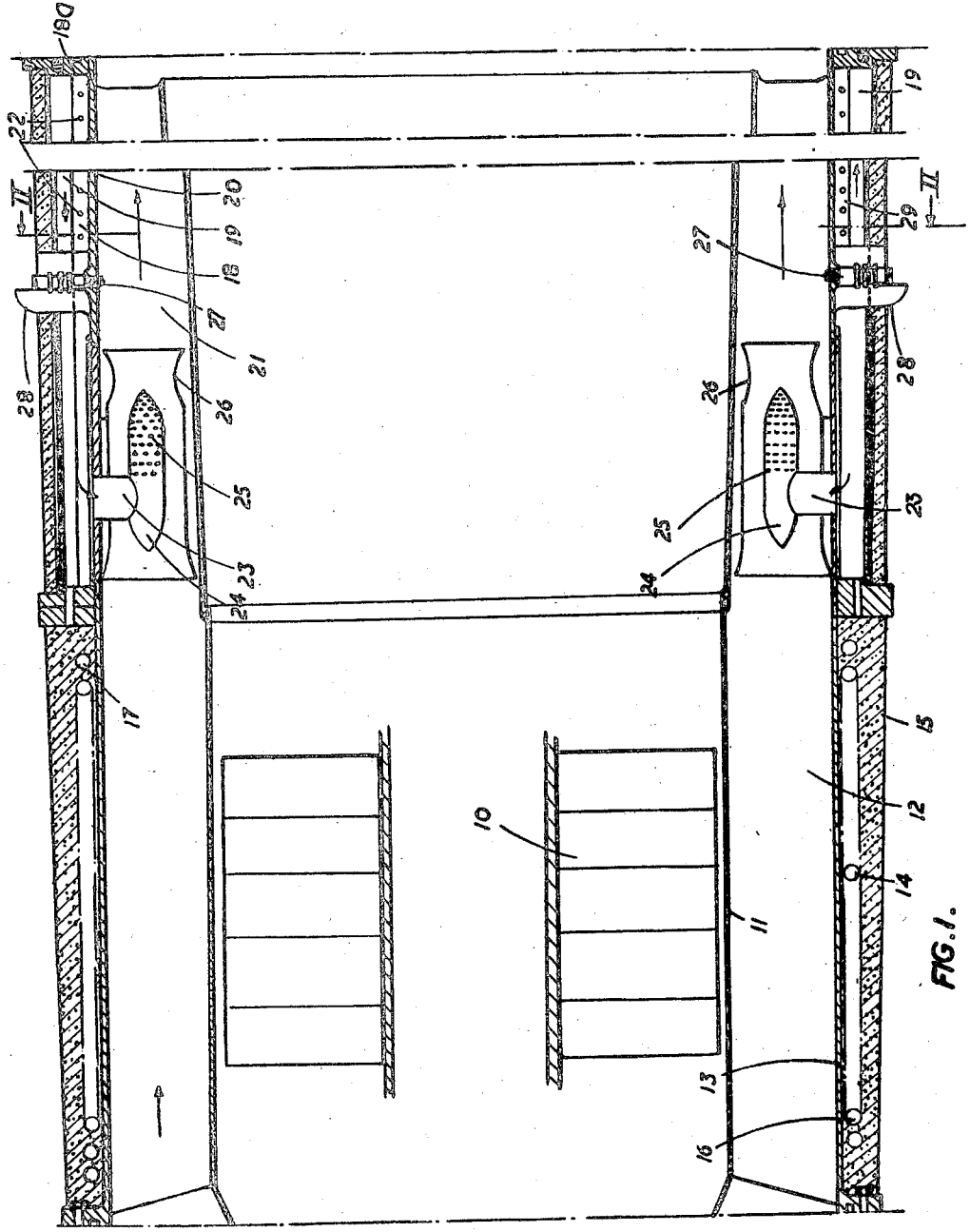

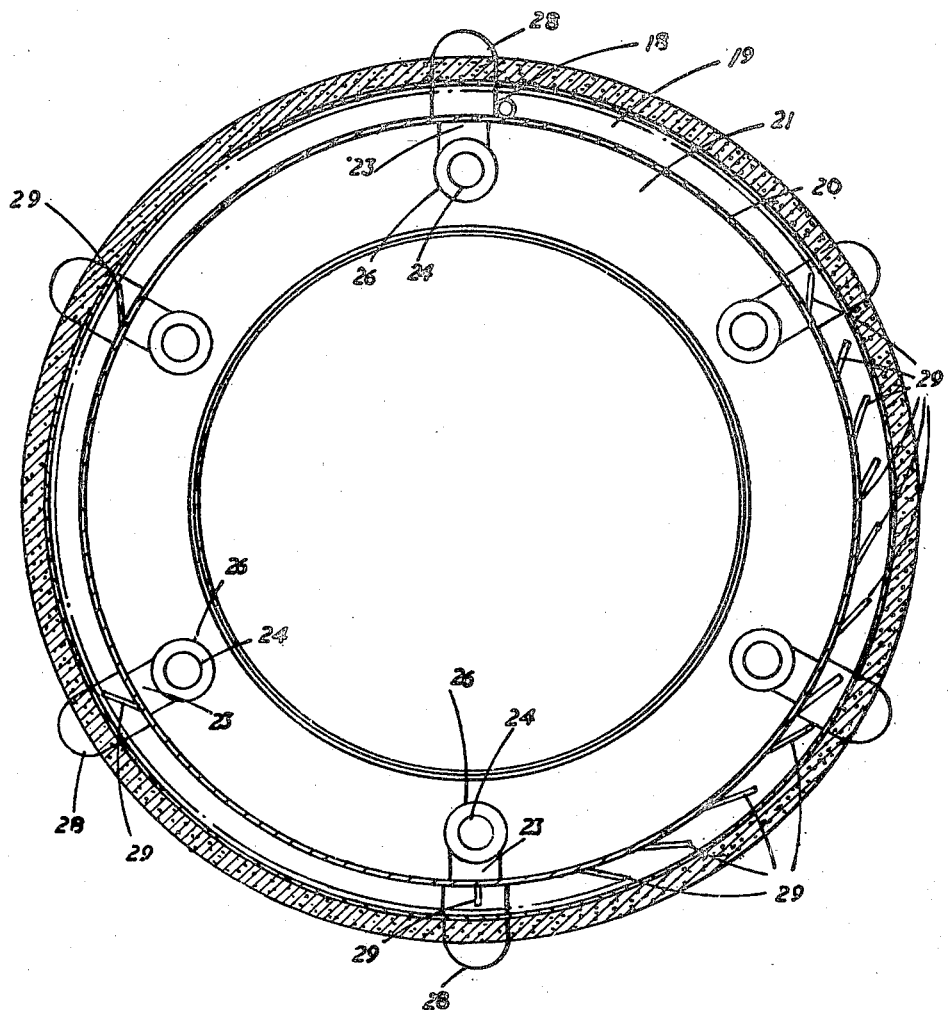

PREHEATING AND VAPORIZATION OF FUEL FOR INTERNAL-COMBUSTION REACTION MOTORS

Hans Knudsen, London, England

Application August 19, 1946, Serial No. 691,593
In Great Britain August 27, 1945

3 Claims. (Cl. 60—44)

This invention relates to an internal combustion reaction motor of the type in which the products of combustion from an explosion chamber are employed to drive a turbine which, in turn, drives a compressor for supplying air to the explosion chamber, and has for its object to increase the efficiency of such a unit for the consumption of a given amount of fuel.

To this end and in accordance with the present invention the fuel is preheated by being pumped through a helically coiled pipe surrounding the casing of the turbine, and is then led to a blind-ended pipe extending along the upper part of an annular space surrounding the combustion chamber of the turbine, said blind-ended pipe being perforated along its sides so that the preheated fuel may issue therefrom and be distributed over the outer surface of the combustion chamber, by the heat of which it is vaporized, the resultant gas being caused to flow rearwardly along said annular space to a number of angularly spaced outlets, each of which leads to a perforated mixing nozzle situated in the path of the air supplied to the combustion chamber.

Preferably there are provided on the outer surface of the combustion chamber a number of longitudinally disposed perforated baffle plates or troughs by which the rate of flow of unvaporized fuel over said surface is checked and by which unvaporized fuel is deflected against that part of said surface which lies below the median horizontal plane of the combustion chamber.

Preferably also the perforated mixing nozzles are situated coaxially in substantially Venturi-shaped pipes leading to the combustion chamber so that the rate of travel of the air is accelerated as it meets the incoming gaseous fuel.

One embodiment of the invention will be described with reference to the accompanying drawings, in which:

Figure 1 is a longitudinal sectional elevation of pre-heating and vaporizing means for an internal combustion reaction motor, and Figure 2 is a cross-section on the line II—II, Figure 1.

Referring to the drawings, a turbine indicated at 10 is contained within a cylindrical casing 11, which forms the inner wall of an annular air-duct 12, the outer wall 13 of which is surrounded by a helically coiled pipe 14 enclosed in insulating material 15. One end 16 of the pipe 14 is connected with a source of supply (not shown) of fuel which is pumped to the pipe 14. The other end 17 of the pipe 14 leads to a blind-ended pipe 18 (closed at 18ª) which extends longitudinally in an annular space 19 surrounding the outer wall 20 of a combustion chamber 21. The pipe 18 is perforated along its length as at 22.

A number of outlets 23 from the annular space 19 are disposed radially around the wall 20, and serve to give access to a number of mixing nozzles 24 having perforations 25 and located in substantially Venturi-shaped pipes 26 which lead from the annular air-duct 12 to the combustion chamber 21. Adjacent to the exits of the pipes 26 are sparking plugs 27 disposed in air-scoops 28 and projecting inwardly through the wall 20 into the combustion chamber 21 in the path of the fuel-air mixture emerging from the pipes 26.

Around the outside of the wall 20 are perforated baffles 29 disposed longitudinally in the inner part of the annular space 19 and, with the exception of the lowest baffle, inclined in the upward sense towards the surface of the wall 20 so as to form troughs therewith, the function of said troughs being to check the speed of descent of the liquid fuel and to deflect it against the surface of the wall 20 especially where said surface underhangs or passes below the median horizontal plane of the combustion chamber 21.

When the turbine 10 is running, air under pressure from a compressor (not shown) driven by the turbine is forced through the annular duct 12, and during its travel gives up some of its heat of compression to the helically coiled pipe 14, thereby warming the fuel which is being pumped through that pipe. The fuel passes to the blind-ended pipe 18 and issues in fine streams through the perforations 22 throughout its length, being thus distributed in opposite directions over the heated outer surface of the wall 20. Vaporization of some of the fuel at once takes place, the remainder falling down and being further distributed by the perforated baffles 29, so that all the fuel is vaporized before it reaches the bottom of the annular space 19. The vaporized fuel passes rearwards and inwards through the outlets 23 into the mixing nozzles 24, from which it issues through the perforations 25 into the stream of pressure air passing from the duct 12 into the Venturi-shaped pipes 26.

It is to be noted that the preheating of the liquid fuel in the helically coiled pipe 14 is insufficient to vaporize it, but when it is distributed in fine streams or a thin film over the outer surface 20 of the combustion chamber 21 it is vaporized completely, as the surface over which it passes is actually the hottest part of the combustion chamber.

I claim:

1. Fuel preheating and vaporizing means for an internal combustion turbine, comprising a casing for the turbine, a helically coiled pipe surrounding the casing, and connected with a source of supply of fuel to be preheated, a combustion chamber, an annular space surrounding the combustion chamber, a blind-ended pipe in communication with one end of said helically coiled pipe and extending along the upper part of said annular space, said blind-ended pipe being perforated along its sides and permitting preheated fuel to issue therefrom and be distributed over and vaporized by the heated outer surface of the combustion chamber, a plurality of angularly spaced outlets located at one end of said annular space, and a corresponding plurality of perforated mixing nozzles adjacent said outlets, for supplying air to said combustion chamber, said nozzles being situated in said passage.

2. Fuel preheating and vaporizing means for an internal combustion turbine, comprising a casing for the turbine, a helically coiled pipe surrounding the casing, and connected with a source of supply of fuel to be preheated, a combustion chamber, an annular space surrounding the combustion chamber, a blind-ended pipe in communication with one end of said helically coiled pipe and extending along the upper part of said annular space, said blind-ended pipe being perforated along its sides and permitting preheated fuel to issue therefrom into said annular space, a plurality of longitudinally disposed perforated baffles angularly spaced around the heated outer surface of said combustion chamber thereby distributing the issued fuel over said heated surface and promoting vaporization, a plurality of angularly spaced outlets located at one end of said annular space, and a corresponding plurality of perforated mixing nozzles adjacent said outlets, for supplying air to said combustion chamber, said nozzles being situated in said passage.

3. Fuel preheating and vaporizing means as claimed in claim 1, having a substantially Venturi-shaped pipe located coaxially around each of the perforated mixing nozzles and serving to accelerate the rate of travel of the supply of air as it meets the gaseous fuel.

HANS KNUDSEN.